United States Patent
Salmén et al.

(10) Patent No.: US 10,114,117 B2
(45) Date of Patent: Oct. 30, 2018

(54) DETECTION OF AN OBJECT BY USE OF A 3D CAMERA AND A RADAR

(71) Applicant: SCANIA CV AB, Södertälje (SE)

(72) Inventors: Mikael Salmén, Uttran (SE); Fredrich Claezon, Värmdö (SE); Carl Fredrik Ullberg, Hägersten (SE); Mikael Lindberg, Solna (SE)

(73) Assignee: SCANIA CV AB (SE)

( * ) Notice: Subject to any disclaimer, the term of this patent is extended or adjusted under 35 U.S.C. 154(b) by 345 days.

(21) Appl. No.: 14/916,329

(22) PCT Filed: Aug. 21, 2014

(86) PCT No.: PCT/SE2014/050957
§ 371 (c)(1),
(2) Date: Mar. 3, 2016

(87) PCT Pub. No.: WO2015/038048
PCT Pub. Date: Mar. 19, 2015

(65) Prior Publication Data
US 2017/0038466 A1  Feb. 9, 2017

(30) Foreign Application Priority Data
Sep. 10, 2013 (SE) .................................... 1351043

(51) Int. Cl.
*G01S 13/86* (2006.01)
*G01S 17/89* (2006.01)
(Continued)

(52) U.S. Cl.
CPC ............ *G01S 13/867* (2013.01); *G01S 7/497* (2013.01); *G01S 13/865* (2013.01);
(Continued)

(58) Field of Classification Search
CPC ...... G01S 13/867; G01S 13/931; G01S 17/36; G01S 17/89; G01S 17/936;
(Continued)

(56) References Cited

U.S. PATENT DOCUMENTS

2004/0118624 A1* 6/2004 Beuhler .................. G01S 17/58
                                                    180/167
2006/0139162 A1* 6/2006 Flynn ...................... G01S 7/003
                                                    340/521
(Continued)

FOREIGN PATENT DOCUMENTS

EP   2 571 003 A1   4/2006
EP   2 107 504 A1   10/2009
(Continued)

OTHER PUBLICATIONS

International Search Report dated Dec. 22, 2014 issued in corresponding International patent application No. PCT/SE2014/050957.
(Continued)

*Primary Examiner* — Timothy A Brainard
(74) *Attorney, Agent, or Firm* — Ostrolenk Faber LLP

(57) ABSTRACT

A method (400) and a 3D camera (110) for a vehicle for detecting an object (130) in an area (140) for collecting (401) measurement data related to the area (140) by a sensor (310) in the 3D camera (110) using a first sensor setting, in addition, reception (402) of measurement data related to the area (140) from a radar (120), and detection (405) of the object (130) based on interpretation of collected (401) measurement data by the camera together with measurement data received (402) from the radar (120).

16 Claims, 5 Drawing Sheets

(51) Int. Cl.
*G01S 13/93* (2006.01)
*G08G 1/16* (2006.01)
*G01S 17/36* (2006.01)
*G01S 17/93* (2006.01)
*G01S 7/497* (2006.01)

(52) U.S. Cl.
CPC ............ *G01S 13/931* (2013.01); *G01S 17/36* (2013.01); *G01S 17/89* (2013.01); *G01S 17/936* (2013.01); *G08G 1/166* (2013.01); G01S 2013/9375 (2013.01); G01S 2013/9382 (2013.01)

(58) Field of Classification Search
CPC ..... G01S 2013/9375; G01S 2013/9382; G01S 7/497; G08G 1/166
USPC ........................................................ 342/52
See application file for complete search history.

(56) References Cited

U.S. PATENT DOCUMENTS

| | | | |
|---|---|---|---|
| 2006/0195231 A1 | 8/2006 | Diebold et al. | 701/1 |
| 2006/0222207 A1 | 10/2006 | Balzer et al. | |
| 2007/0055446 A1* | 3/2007 | Schiffmann | G01S 7/4026 701/301 |
| 2008/0239280 A1 | 10/2008 | Watgen et al. | 356/5.1 |
| 2009/0135065 A1 | 5/2009 | Tsuchida et al. | |
| 2009/0252380 A1 | 10/2009 | Shimizu | |
| 2009/0292468 A1 | 11/2009 | Wu et al. | |
| 2010/0030474 A1 | 2/2010 | Sawada | |
| 2010/0253597 A1* | 10/2010 | Seder | B60R 1/00 345/7 |
| 2013/0148855 A1 | 6/2013 | Yasugi et al. | 382/103 |
| 2013/0226390 A1 | 8/2013 | Luo et al. | |

FOREIGN PATENT DOCUMENTS

| | | |
|---|---|---|
| EP | 1 650 725 A1 | 3/2013 |
| JP | 2009-508096 A | 2/2009 |
| JP | 2012-035831 A | 2/2012 |
| JP | 2012-154731 A | 8/2012 |
| JP | 2013-057584 A | 3/2013 |
| WO | WO 2008/068620 A2 | 6/2008 |

OTHER PUBLICATIONS

International Preliminary Report on Patentability dated Nov. 24, 2015 issued in corresponding International patent application No. PCT/SE2014/050957.

Office Action dated Apr. 5, 2018 in corresponding Korean Patent Application No. 10-2016-7007512, along with an English translation thereof.

* cited by examiner

DETECTION OF AN OBJECT BY USE OF A 3D CAMERA AND A RADAR

CROSS-REFERENCE TO RELATED APPLICATIONS

The present application is a 35 U.S.C. §§ 371 national phase conversion of PCT/SE2014/050957, filed Aug. 21 2014, which claims priority of Swedish Patent Application No. 1351043-3, filed Sep. 10, 2013, the contents of which are incorporated by reference herein. The PCT International Application was published in the English language.

TECHNICAL FIELD OF THE INVENTION

This document describes a 3D camera and a method in a 3D camera. More specifically, a mechanism is described for detecting an object based on interpreting measurement data collected by the 3D camera together with measurement data received from a radar.

BACKGROUND

A 3D camera is sometimes arranged in a vehicle to assist the vehicle driver, for example, to determine distances to a lead vehicle or another object. Such a 3D camera can consist in this context of, for example, a Time of Flight (ToF) camera, a stereo camera, a light-field camera or the like.

The 3D camera can determine distances to objects by emitting a modulated lightwave, detecting a corresponding reflected lightwave from the object and measuring the shift of the reflected lightwave in relation to the emitted lightwave. The distance can be calculated because the wavelength and speed of the light are known.

One problem for 3D cameras to determine distances is that vehicles often have different surfaces that reflect the light to different extents. For example, the body of a car with metallic paint may reflect light very well, while the windows of the same vehicle may reflect very little light. This can cause far too little light being reflected from certain objects to enable the 3D camera to make a reliable measurement. In the worst case, this can result in the object not being detected by the 3D camera, or in an erroneous assessment of the size of and/or distance to the object to be made. Alternatively, the 3D camera may determine that there is a plurality of separate objects.

Another problem with 3D cameras can arise when, for example, a person is situated in proximity to a vehicle, or when a group of people is walking across a crosswalk. The 3D camera can then have difficulty distinguishing the person and the vehicle, and may interpret them as a single coherent object.

Furthermore, a 3D camera can have difficulty determining whether an object is, for example, a pole or an (uncommonly narrow and straight-backed) person, or between a concrete obstacle and an animal. This can be a problem in an emergency situation where emergency braking in combination with evasive maneuvers need to be performed and objects lying ahead need to be assigned priorities.

It is clear that much remains to be done to improve the ranging and detection of objects by means of a 3D camera.

SUMMARY OF THE INVENTION

One object is consequently to improve object detection by means of a 3D camera in order to solve at least one of the aforementioned problems and thereby achieve improved detection of objects in an area.

According to a first aspect, this object is achieved by means of a method in a 3D camera for a vehicle, which camera is arranged so as to detect an object in an area. The method comprises the collection and measurement of data related to the area by means of a sensor in the 3D camera, wherein the sensor has a given sensor setting. The method further comprises the reception of measurement data related to the area, from radar. The method also comprises the detection of the object, based on interpretation of collected measurement data together with measurement data received from the radar.

According to a second aspect, this object is achieved by means of a 3D camera for a vehicle, arranged so as to detect an object in an area. Such a 3D camera comprises a sensor arranged so as to collect measurement data related to the area, wherein the sensor has a given sensor setting. The 3D camera also comprises a signal receiver arranged so as to receive, from a radar, a signal containing measurement data related to the area. The 3D camera further comprises a processor card arranged so as to detect an object based on interpretation of measured measurement data together with measurement data received from the radar.

The risk of erroneous detections or missed detections as a result of, for example, objects that reflect light signals poorly can thereby be reduced by using a radar and measurement data from a radar to supplement the measurement data detected by a 3D camera and, according to certain embodiments, adjusting the sensor setting of the 3D camera based on measurement data received from the radar. Improved detection of objects within a certain measurement range and greater confidence in the obtained results can be achieved thereby. Furthermore, a distinction can be made between hard objects and soft objects, as the radar is adept at detecting hard objects but less adept at detecting soft objects, while the 3D camera may, in certain cases, have difficulty in detecting certain types of hard objects by itself. Performing such supplementation of the measurement data from the 3D camera with auxiliary information from the radar rather than in an external calculating unit makes it possible to reduce the amount of data that need to be transferred between the units, which results in more rapid detection of the object. Reducing the time it takes for the 3D camera to detect an object thus represents an important safety aspect, as it then becomes possible to, for example, provide a driver with an earlier warning and a longer reaction time, or to trigger automatic braking, triggering of airbags or the like.

Improved detection and potential classification of objects can then be used, for example in a vehicle, to carry out certain accident-avoidance or injury-reducing measures in the event of a potential accident, such as triggering a warning sound, braking the vehicle, initiating an evasive vehicle maneuver so that a collision with a soft object is avoided, triggering airbags outside the vehicle when a collision with a soft object is imminent, and the like. Improved and more reliable detection of objects in an area is achieved thereby.

Other advantages and additional new features will be presented in the detailed description below.

LIST OF FIGURES

Embodiments of the invention will now be described in greater detail with reference to the accompanying figures, which illustrate various exemplary embodiments:

DETAILED DESCRIPTION

Embodiments of the invention comprise a method and a 3D camera, which can be realized according to any of the examples described below. However, this invention can be realized in many different forms, and must not be viewed as being limited by the embodiments described herein, which are intended rather to elucidate and clarify various aspects.

Additional aspects and features of the invention can be apparent from the following detailed description when it is considered in combination with the accompanying figures. However, the figures are to be viewed only as examples of different embodiments of the invention, and must not be seen as limitative of the invention, which is limited solely by the accompanying claims. In addition, the figures are not necessarily drawn to scale and are, unless otherwise specifically stated, intended to illustrate aspects of the invention conceptually.

Figure 1A:
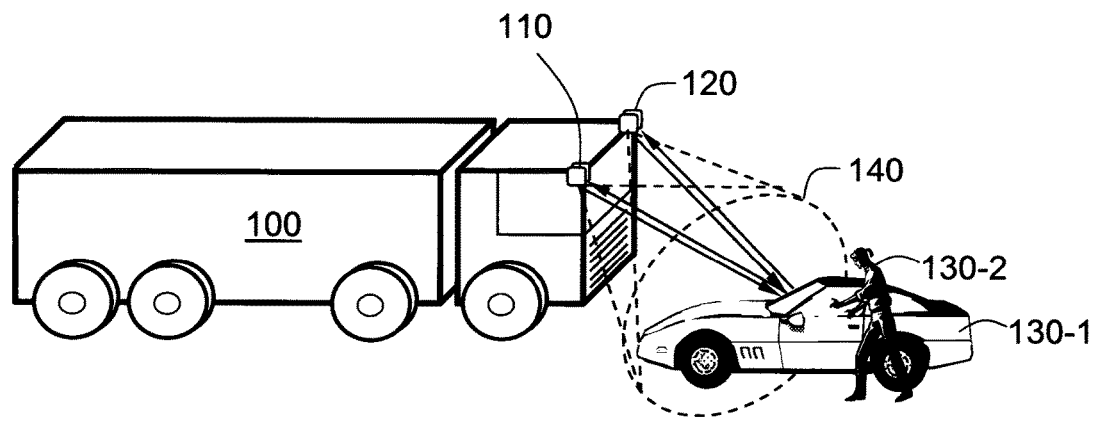
FIG. 1A illustrates a scenario in which a vehicle with a 3D camera and a radar detects an object according to one embodiment.

FIG. 1A shows a vehicle 100 with a 3D camera 110 and a radar 120. The 3D camera 110 can consist of, for example, a Time of Flight (ToF) camera, a stereo camera, a light-field camera or a similar type of optical sensor.

The 3D camera 110 can determine the presence of and distance to an object 130 that is located within a given measurement area 140 by emitting a modulated lightwave, detecting a corresponding reflected lightwave from the object 130 and measuring the shift of the reflected lightwave in relation to the emitted lightwave. The distance to the object 130 and various surfaces thereon can be calculated because the wavelength and the speed of the light are known parameters. In the illustrated example, the object 130 comprises two sub-objects, a sports car 130-1 and its driver 130-2.

A Time-of-Flight camera is a camera system that takes a sequence of images and measures a distance to an object based on the known speed of light by measuring the time it takes for a light signal to pass between the camera and the subject/object.

The radar 120 (the word radar is an acronym for "Radio Detection and Ranging" in English, but also a palindrome that "reflects" the way in which radar works) performs ranging of the object 130 by means of radio waves. A radio signal is emitted, reflected by the object 130, and the reflection is then detected by the radar 120.

According to one embodiment of the invention, the 3D camera collects measurement data within a measurement area, which lies in front of the vehicle 100 in the illustrated example. The 3D camera 110 also receives measurement data collected from the measurement area by the radar 120. Because the 3D camera is given access to auxiliary information from the radar 120, which has a different working method based on radio waves rather than light, logic in the 3D camera 110 can draw a conclusion as to how the collected measurement data are to be interpreted, e.g. how measurement points are to be clustered at an object 130, and make a delimitation between a first object 130-1 and a nearby or overlapping second object 130-2. The 3D camera 110 can also use the auxiliary information received from the radar 120 to draw the conclusion that the measurement data that the camera itself has collected are incomplete or unreliable, e.g. if the radar 120 sends measurement data that indicate the presence of an object that the 3D camera 110 has difficulty perceiving, e.g. a transparent or lowly reflective object. It is thus also possible to calibrate the 3D camera 110 so as to be better able to determine the presence of such an object, e.g. by modulating the emitted light, changing the exposure time, the wavelength of the emitted light, the light intensity or a similar parameter, or by changing a plurality of sensor settings. In certain embodiments, the 3D camera 110 can use auxiliary information from the radar 120 to confirm the presence of an object 130 that the 3D camera 110 has already detected, which results in more reliable detection. The 3D camera can thus detect an object 130 based on an interpretation of collected measurement data together with measurement data received from the radar 120.

The object 130 can consist of one or more separate objects, such as a vehicle, a road sign, a pedestrian, an animal, a wall, a building, a tree or the like. In this case a first object 130-1 and a second object 130-2 are present within the measurement area 140. The first object 130-1 consists here of a vehicle, while the second object 130-2 consists of the driver of the vehicle.

It is of no significance to the described method or the 3D camera whether the object 130 is in motion or standing still. The method is also independent of whether the 3D camera is mounted on a vehicle 100 or not, and of whether said optional vehicle 100 is standing still or in motion. Embodiments are conceivable in which the 3D camera is mounted on a stationary object, e.g. to detect the passage of vehicles over a bridge, onto a ferry, for area surveillance or the like.

Vehicle 100 refers in this context to, for example, a goods vehicle, long-haul semi, transport vehicle, personal vehicle, emergency vehicle, car, all-terrain vehicle, tracked vehicle, bus, boat, ferry, amphibious vehicle, airplane, helicopter or other similar motorized manned or unmanned means of transport adapted for waterborne, airborne or land-based geographical movement.

For example, the 3D camera 110 and/or the radar 120 can be arranged in the cab of the vehicle 100, on the roof of the cab or behind the vehicle 100 so as to be able to detect an object 130 behind the vehicle 100, to name just a few examples of conceivable placements. The radar 120 can, for example, be of the omnidirectional type and be housed in the rearview mirror of the vehicle. According to certain embodiments, an object 130 that is located in a direction in which the driver has a limited or non-existent field of view from the driver seat can be detected thereby.

In this example, the first object 130-1 consists of a sports car in a bright metallic color, which reflects light emitted by the 3D camera 110 very well, while the many glass windows and transparent plastic roof reflect light poorly, as do the dull tires of the vehicle. This can cause the 3D camera to perceive the object 130 within the area 140 in, for example, the manner illustrated in FIG. 1B.

On the other hand, the radar 120, which emits and receives reflections of radio signals, has no problem detecting glass surfaces or the transparent plastic roof of the vehicle, i.e. the first object 130-1, but may conversely have problems perceiving the second object 130-2, i.e. the vehicle driver, as the radio signals may be reflected only sparingly thereby. Perhaps the radar 120 will then perceive the object 130 within the area 140 in, for example the manner illustrated in FIG. 1C.

According to one embodiment of the invention, the radar 120 sends measurement data to the 3D camera 110, which is arranged so as to compare the measurement data perceived by the 3D camera with measurement data received by the radar 120. Because at least some measurement points within the area 140 will often be detected by both the 3D camera 110 and the radar 120, an adaptation of the measurement data can be performed, as can a comparison of detections within the area 140. An example of such a comparison is shown in FIG. 1D.

Figure 1B:
FIG. 1B illustrates an example of how the 3D camera perceives its surroundings.

FIG. 1B shows an example of how the 3D camera 110 may perceive the object 130 within the range 140 when the object 130 consists of a metallic painted sports car 130-1 and its driver 130-2.

The glass windows and the transparent plastic roof of the sports car 130-1 reflect the emitted light poorly, particularly compared to the very strong reflection from the metallic paint. Furthermore, the 3D camera 110 will perceive the sports car 130-1 and its driver 130-2 as a single object, or as a person with a wagon/baby carriage/cart or the like, or as a group of people at, for example, a crosswalk, because without auxiliary information from the radar 120, the 3D camera 110 may find it difficult to distinguish hard and soft objects from one another.

Figure 1C:
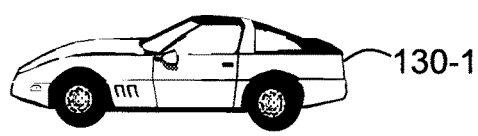
FIG. 1C illustrates an example of how the radar perceives the same surroundings.
Figure 1D:
FIG. 1D illustrates a combination of measurement data obtained by the 3D camera and the radar.

FIG. 1C shows an example of how the radar 120 may perceive the same object 130 within the area 140 as the 3D camera in FIG. 1B.

The radar 120 perceives hard surfaces such as glass or metal on the vehicle 130-1 well, but conversely perceives soft objects such as the vehicle driver 130-2 poorly or not at all.

FIG. 1D shows an example of a merging of the image information detected within said area 140 by both the 3D camera 110 and the radar 120.

Supplementing the image information obtained from the 3D camera 110 with additional information detected by the radar 120 makes it possible to obtain more complete and accurate information about the situation within the area 140. It also makes possible a way of distinguishing between hard objects 130-1, such as vehicles, and soft objects 130-2, such as people or animals. This information can be used, for example, in an emergency situation to perform an evasive maneuver toward the hard object 130-1 and thereby avoid injuries to people/animals at the soft object 130-2. In some embodiments, the information can be used to carry out safety measures to reduce injuries, such as triggering the airbag in the vehicle 100 by the driver seat when a collision with a hard object 130-1 is imminent, or triggering airbags in front of the vehicle 1000, e.g. deployed on the bumper, when a collision with a soft object 130-2 such as a person or an animal is imminent. This is not possible using the prior art, as the uncertainty is too great. Furthermore, the detection of soft objects 130-2 in a measurement area 140 that coincides with the roadway of the vehicle or are in proximity to the roadway can trigger an alarm to alert the driver of said soft object, such as an elk that is standing on the side of the road three hundred meters ahead. In certain embodiments, accident-limiting actions can be triggered, such as making an evasive maneuver away from the soft object 130-2, initiating braking, tightening seatbelts in the vehicle 100 when a collision is imminent, or the like.

Figure 2A:
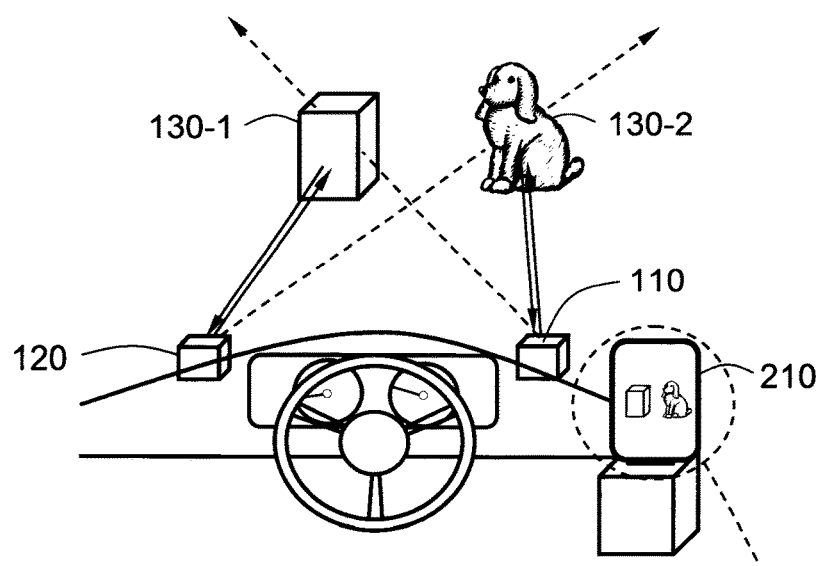
FIG. 2A illustrates a scenario in which a vehicle with a 3D camera and a radar detects an object according to one embodiment.

FIG. 2A illustrates another scenario in which a vehicle 100 with a 3D camera 110 and a radar 120 detects an object 130 within a measurement area 140 according to one embodiment.

In this scenario, the measurement area 140 is occupied by a first hard transparent object 130-1, such as a glass sculpture (like the one near the roundabout at Sergei Square in Stockholm), and a soft object 130-2 such as a dog.

Here the 3D camera 110 perceives the soft object 130-2 without difficulty, while the light beams are able to pass through the transparent object 130-1 without being reflected, being reflected in the wrong direction or being reflected incompletely.

The situation is essentially reversed with the radar 120, in that the radio waves that are emitted by the radar 120 pass through the soft object 130-2 without being reflected, or being reflected by, for example, skeletal components, whereupon it is difficult to determine whether the received reflection coming from an object 130 is the result of a measurement error or the like. Conversely, the radio waves are reflected extremely well by the glass walls of the transparent object 130-1.

Because the 3D camera 110 receives measurement data related to the measurement area 140 from the radar 120, said measurement data can be compared and analyzed, so that an object 130 within the measurement area 140 can be detected in a more reliable manner than according to the prior art. Furthermore, a detected object 130 can be classified as a hard object 130-1 or a soft object 130-2. This classification can then be used to avoid or reduce injuries associated with a potential accident, as described above.

Figure 2B:
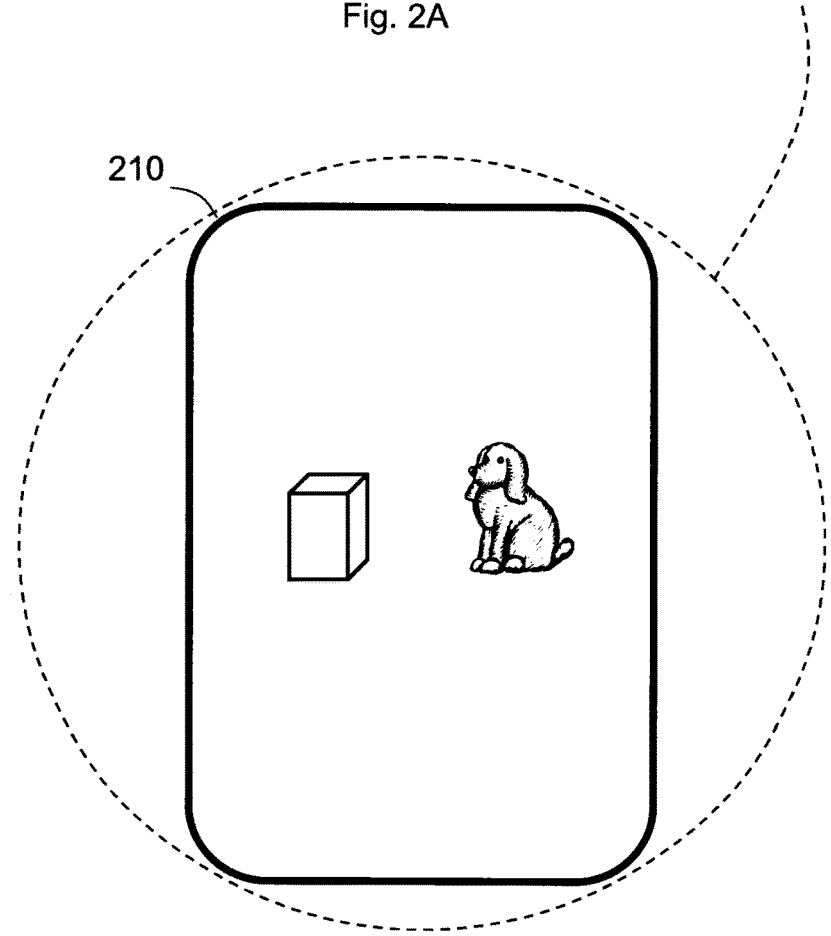
FIG. 2B shows an example of a presentation of a combination of measurement data obtained by the 3D camera and the radar.

Furthermore, a detected object 130 can, as a result of measurement data compared by the 3D camera 110, be presented for the vehicle driver on, for example, a display screen 210 in certain embodiments, as illustrated in FIG. 2B. This can be advantageous when, for example, the vehicle 100 is reversing or when visibility is limited; while driving in darkness, fog, heavy precipitation and the like. Such a display screen 210 can thus be used as a driver aid in certain embodiments.

Figure 3:
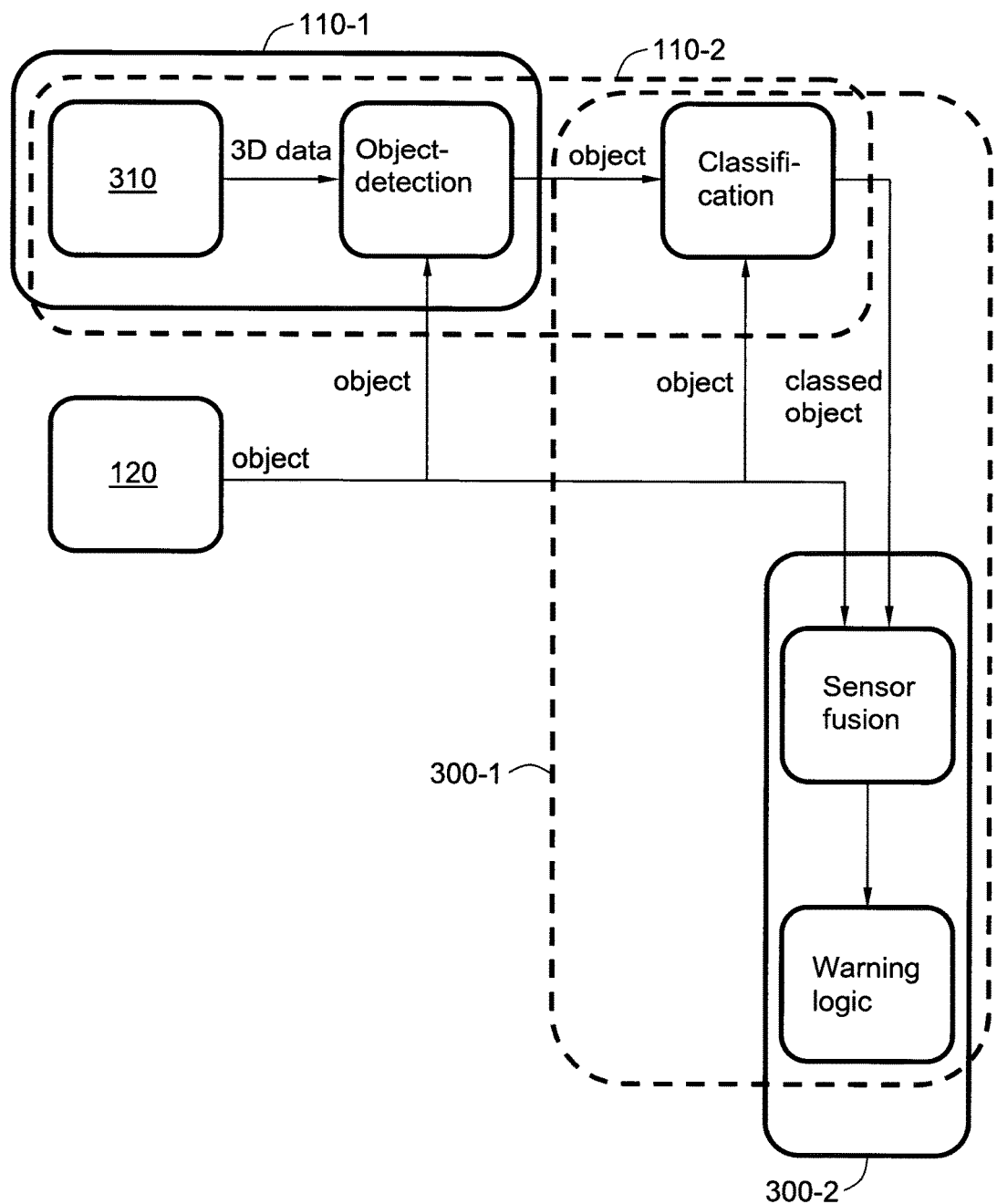
FIG. 3 is a combined flow diagram and block diagram according to one embodiment of the invention.

FIG. 3 illustrates an example of a conceptual principle according to one embodiment of the invention.

The 3D camera 110 comprises a sensor 310. The sensor 310 collects measurement data from measurement points in the area 140 and sends said measurement data for object detection by a processor in the 3D camera 110. The radar 120 also collects measurement data from measurement points in the area 140 and sends its measurement data in, for example, the form of an object for object detection by a processor in the 3D camera 110.

In a first embodiment of the 3D camera 110-1, the results of this object detection can then be sent to a first embodiment of a calculating unit 300-1, which can perform a classification of the detected object 130 or objects 130-1, 130-2, as may be the case. These objects can be classified as a hard object 130-1 or a soft object 130-2 by comparing measurement data such as objects detected by means of the 3D camera sensor 310 or the radar 120.

In another embodiment of the 3D camera 110-2, the aforedescribed classification can instead be performed in the 3D camera 110-2, e.g. in the 3D camera processor.

In another embodiment of the calculating unit 300-2, no classification is performed. In certain embodiments of the calculating unit 300-1, 300-2 a sensor fusion of objects received from the 3D camera 110-1, 110-2 and the radar 120 can be performed instead. Based on such a sensor fusion, warning logic can, according to certain embodiments, trigger accident-preventing or accident-consequence-reducing measures such as alerting the attention of the driver to pedestrians on the roadway, preventing velocity increases when the roadway is blocked, initiating braking or the like.

Figure 4:
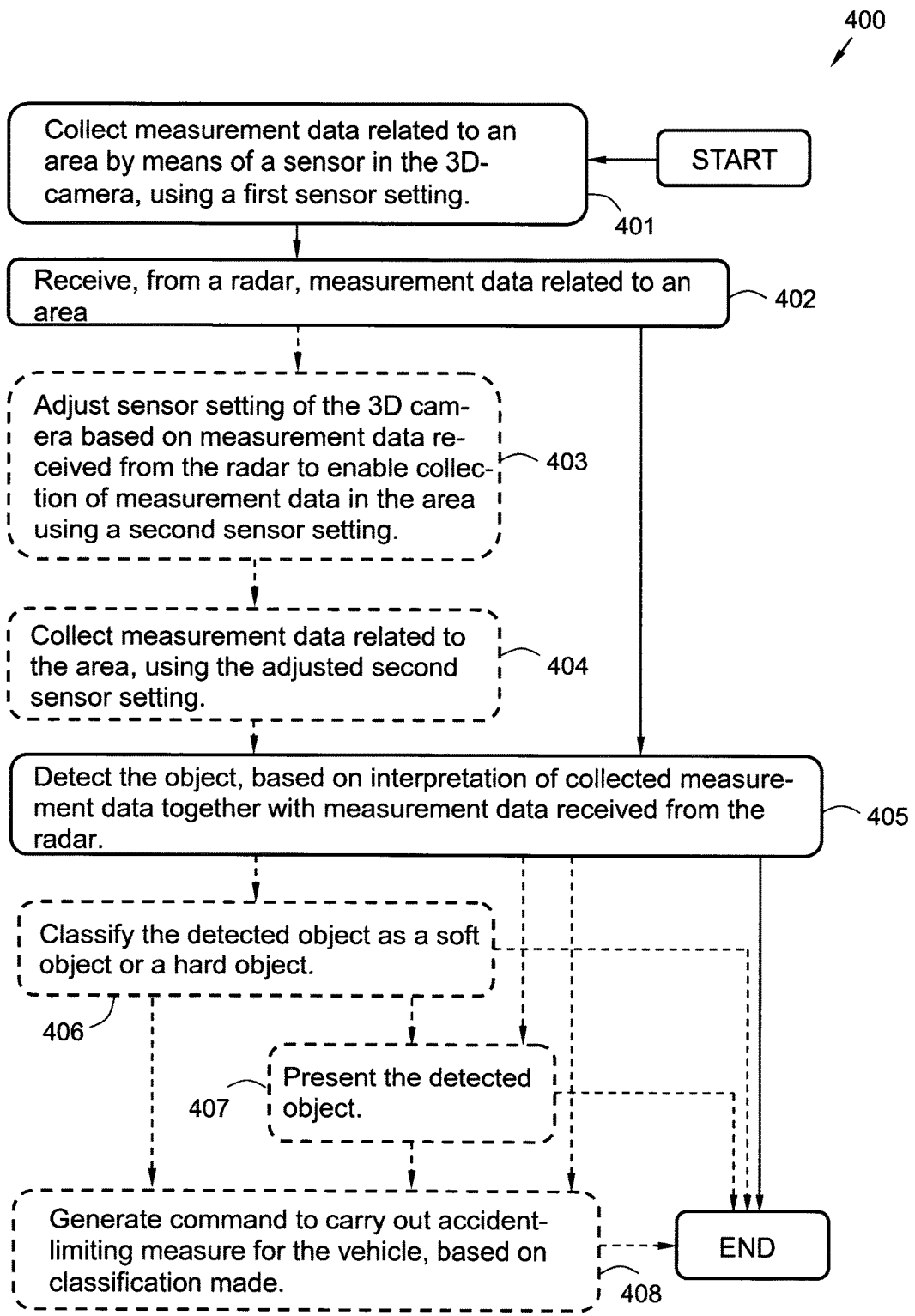
FIG. 4 is a flow diagram that illustrates one embodiment of the invention.

FIG. 4 illustrates an example of one embodiment of the invention. The flow diagram in FIG. 4 illustrates a method 400 in a 3D camera 110 for detecting an object 130 in an area 140 as a measurement area.

The 3D camera 110 can consist of, e.g. a Time of Flight (ToF) camera, a stereo camera, a light-field camera, a radar measuring device, a laser measuring device, a LIDAR, an optical sensor or a similar device according to various embodiments.

In order to be able to detect objects 130 in the measurement area 140 correctly, the method 400 can comprise a number of steps 401-408. However, it should be noted that some of the described steps 401-408 can be performed in a chronological order different from that indicated by the numerical order, and that some or a plurality of them can be performed in parallel with one another, according to certain embodiments. Furthermore, certain steps are performed only in certain embodiments, such as steps 403, 404, 406, 407 and/or step 408. The method 400 comprises the following steps:

Step 401

Measurement data related to the area 140 are collected by a sensor 310 in the 3D camera 110, using a first sensor setting. Such measurement data can include measurement points detected by the 3D camera 110 in the area 140.

Step 402

Measurement data related to the area 140 are received from a radar 120. Measurement data can be received over a wire-bound or wireless interface, according to different embodiments. Measurement data received from the radar 120 can include measurement points detected by the radar 120 in the area 140.

Measurement data can be received over a wire-bound or wireless interface, according to different embodiments. Furthermore, the calculating unit 200 can be contained in the radar 120, according to certain embodiments.

Step 403

This method step may be included in some but not necessarily all embodiments.

A sensor setting in the 3D camera 110 can be adjusted based on measurement data received 402 from the radar 120 in order to enable the collection of measurement data in the area 140 using a second sensor setting. The sensor setting in the 3D camera 110 can comprise, for example, any of the following: changing the exposure time of the 3D camera, modulating the frequency of the emitted lightwave, phase-shifting the emitted lightwave and/or the strength of the emitted light.

Step 404

This method step may be included in some but not necessarily all embodiments.

Measurement data related to the area 140 can be collected using the adjusted 403 second sensor setting.

Step 405

The object 130 is detected based on the interpretation of collected 401 measurement data together with measurement data received 402 from the radar 120. Such an interpretation of measurement data can comprise a matching the measurement points detected by the 3D camera 110 with measurement data received 302 from the radar 120. The interpretation of collected 401, 404 measurement data together with measurement data received 402 from the radar 120 includes a matching of these measurement points with measurement data received 402 from the radar 120.

Step 406

This method step may be included in some but not necessarily all embodiments.

The detected 303 object 130 is classified as a soft object 130-2 or a hard object 130-1 based on measurement data collected 401, 404 from the 3D camera 110 and measurement data received 402 from the radar 120.

An object 130 detected distinctly by the radar 120 but indistinctly or not at all by the 3D camera 100 can thus be classified as a hard object 130-1. Furthermore, an object 130 that is detected distinctly by the 3D camera 110 but indistinctly or not at all by the radar 120 can be classified as a soft object 130-2, according to certain embodiments.

Step 407

This method step may be included in some but not necessarily all embodiments.

The detected 405 object 130 can be presented, e.g. for the vehicle driver. The presentation can be done on a display screen 210 or the like.

Such a presentation can provide decision-making support for the driver and be of value, particularly when reversing or in clarifying the surroundings at angles that are not visible to the driver from the driver seat. Another advantage is that the driver can be alerted to objects 130 that are present on the roadway or in proximity to the roadway when visibility is limited as a result of darkness, fog, precipitation, oncoming lights or the like.

Step 408

This method step may be included in some but not necessarily all embodiments, wherein the 3D camera 110 and the radar 120 can be contained in a vehicle 100.

A command is issued to carry out an accident-limiting measure for the vehicle 100, based on the classification 406 made. This classification 406 can consist of a hard object 130-1 or a soft object 130-2. The accident-limiting action can comprise, for example, triggering an airbag in the vehicle 100 when a collision with a hard object 130-1 is imminent, or triggering airbags in front of the vehicle 100, e.g. disposed on the bumper of the vehicle, when a collision with a soft object 130-2 such as a person or an animal is imminent.

In an emergency situation in which the braking distance of the vehicle exceeds the braking distance necessary to stop the vehicle 100 before the hard object 130-1 and the soft object 130-2, the accident-limiting action can further comprise the performance of an evasive maneuver, so that a collision with the soft object 130-2 is avoided, even if this entails a collision with the hard object.

Serious injuries to pedestrians and/or cyclists can thus be avoided.

Figure 5:
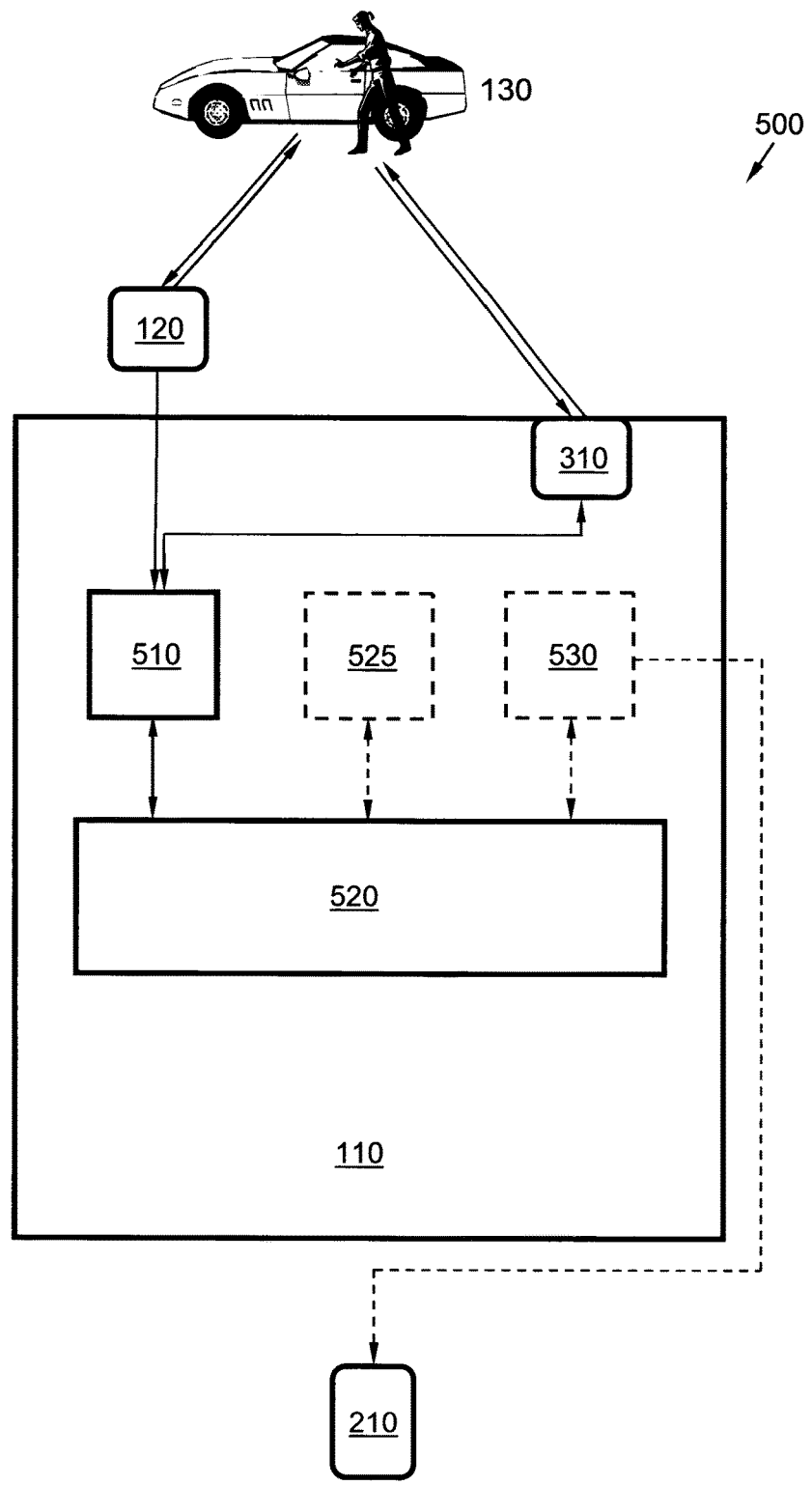
FIG. 5 is an illustration of a calculating unit connected to a 3D camera according to one embodiment of the invention.

FIG. 5 shows an embodiment of a system 500 that includes a 3D camera 110 and a radar 120 for detecting an object 130 in an area 140.

The system 500 for detecting the object 130 in the area 140 comprises a 3D camera 110 arranged so as to emit a lightwave toward the area 140 and receive a reflection of said lightwave from a measurement point. The 3D camera 110 can consist, for example, of a Time of Flight camera, a stereo camera, a light-field camera or the like. The system 500 further comprises a radar 120 arranged so as to emit a radio wave toward the area 140 and receive a reflection of said radio wave from a measurement point. In certain cases the 3D camera 110 and/or the radar 120 can constitute a physical unit, even though they continue to constitute distinct logic units.

The 3D camera 110 is arranged so as to perform at least parts of the method 400 for detecting an object 130 in an area 140.

In order to be able to perform the method 400 in a correct manner, the 3D camera 110 comprises a number of components, which are described in greater detail below. Some of the described subcomponents appear in some but not necessarily all embodiments. According to some embodiments of the invention, additional electronics may also be present in the 3D camera 110 that are not entirely necessary for an understanding of the function of the 3D camera 110 and the method 400.

The 3D camera 110 comprises a sensor 310 arranged so as to collect measurement data related to the area 140 using a first sensor setting. Such a sensor 310 can be arranged so as to collect measurement data related to the area 140 using the adjusted second sensor setting. Such a sensor setting in the 3D camera 110 can comprise, for example, any of the following: changing the exposure time of the 3D camera, modulating the frequency of the emitted lightwave, phase-shifting the emitted light wave and/or the strength of the emitted light.

The 3D camera 110 further comprises a signal receiver 510 arranged so as to receive a signal containing measurement data related to the area 140 from a radar 120.

Such signal receiving of measurement data from the radar 120 can be performed over a wire-bound or wireless interface according to different embodiments. The wire-bound interface can, for example, comprise or be based on a cable connection, an internet-connected network or a communication bus system consisting of one or more communication buses for connecting the units 110, 120 enumerated above with one another or alternatively with other units such as a control unit, monitoring unit and/or sensors. The communication bus can, for example, consist of one or more of a cable; a data bus, such as a CAN bus (Controller Area Network bus), a MOST bus (Media Oriented Systems Transport) or any other bus configuration. The wireless interface can, for example, be based on or inspired by any of the following technologies: Global System for Mobile Communications (GSM), Enhanced Data Rates for GSM Evolution (EDGE), Universal Mobile Telecommunications System (UMTS), Code Division Access (CDMA), (CDMA 2000), Time Division Synchronous CDMA (TD-SCDMA), Long Term Evolution (LTE); Wireless Fidelity (Wi-Fi), defined by the Institute of Electrical and Electronics Engineers (IEEE) standards 802.11 a, ac, b, g and/or n, Internet Protocol (IP), Bluetooth and/or Near Field Communication, (NFC), or on a similar communication technology according to different embodiments.

The 3D camera 110 also comprises a processor circuit 520 arranged so as to detect an object 130 based on the interpretation of measured measurement data together with measurement data received from the radar 120.

The processor circuit 520 can alternatively also be arranged so as to classify the detected object 130 as a soft object 130-2 or a hard object 130-1 based on measurement data received from the 3D camera 110 and the radar 120, according to certain embodiments.

Furthermore, the processor circuit 520 can also be arranged, according to certain embodiments, so as to send information in order to present the detected object 130 on a display screen 210.

The process circuit 520 can further be arranged so as to interpret measurement data that include measurement points detected in the area 140 by the 3D camera sensor 310 by matching measurement points collected and detected by the 3D camera 110 in the area 140 with measurement data received from the radar 120.

The processor circuit 520 can also be arranged so as to adjust the sensor setting of the 3D camera 110 based on measurement data received from the radar 120 so as to enable the collection of measurement data in the area 140 using a second sensor setting.

According to certain embodiments, the 3D camera 110 and the radar 120 can be contained in a vehicle 100 of any arbitrary type, such as a wheel-borne transport vehicle type. In certain embodiments, the processor circuit 520 can be arranged so as to generate a command to carry out an accident-limiting measure for the vehicle 100, based on the classification made.

The processor circuit 520 can consist, for example of one or more of a Central Processing Unit (CPU), microprocessor or other logic designed so as to interpret and carry out instructions and/or read and write data. The processor circuit 520 can process data for inflows, outflows or data-processing of data including the buffering of data, control functions and the like.

In certain embodiments, the 3D camera 110 can further comprise a signal transmitter 530 arranged so as to send a control signal, e.g. to trigger a warning signal or the like when an object 130 is detected in the measurement area 140. The signal transmitter 530 can also be arranged so as to send signals to a display screen 210 for presenting the detected object 130 in the area 140. In certain embodiments, the signal transmitter 530 can be arranged so as to send a control signal to prevent acceleration of the vehicle 100 and/or to initiate braking of the vehicle 100 and/or to initiate an evasive maneuver from the object 130, particularly if the object is classified as a soft object 130-2, according to certain embodiments. In certain embodiments, the signal transmitter 530 can be arranged so as to send a control signal to trigger an airbag outside the vehicle 100 when a collision with a soft object 130-2 can be predicted.

The 3D camera 110 can, according to certain embodiments, also comprise a memory unit 525 that, in certain embodiments, can consist of a storage medium for data. The memory unit 525 can consist, for example, of a memory card, flash memory, USB memory, hard drive or another similar data-storage unit, such as any of the group comprising: ROM (Read-Only Memory), PROM (Programmable Read-Only Memory), EPROM (Erasable PROM), Flash memory, EEPROM (Electrically Erasable PROM), etc. in various embodiments.

According to certain embodiments, the invention further comprises a computer program for detecting an object 130 in an area 140 in that a method 400 according to at least one of the method steps 401-408 is performed in the computer program is executed in a processor circuit 520 in the 3D camera 110.

The method 400 according to at least one of the steps 401-408 can thus be implemented by means of one or more processor circuits 520 in the 3D camera 110 together with computer program code for performing one, some, certain or all of the steps 401-408 described above when a computer program containing instructions for performing the steps 401-408 is loaded into the processor circuit 520.

The aforedescribed computer program is, in certain embodiments, arranged so as to be installed in the memory unit 525, e.g. over a wireless or wire-bound interface, e.g. any of those enumerated above.

The aforedescribed and discussed units the signal transmitter 510, and/or signal transmitter 530 can, in certain embodiments, consist of a separate transmitter and receiver. However, in certain embodiments, the signal receiver 510 and the signal transmitter 530 in the 3D camera 110 can consist of a transceiver that is adapted so as to transmit and receive signals, such as radio signals, and wherein parts of the design, e.g. the antenna if present, are common to both transmitter and receiver. Said communication can be adapted for wireless information transfer, via radio waves, WLAN, Bluetooth or an infrared transceiver module. However, the signal receiver 510 and/or signal transmitter 530 can, in certain embodiments, alternatively be specially adapted for wire-bound information exchange, or alternatively for both wireless and wire-bound communication according to certain embodiments.

Some embodiments of the invention also include a vehicle 100 that contains a system 500 installed in the vehicle 100 and arranged so as to perform a method 400 according to at least one of the method steps 401-408 in order to detect an object 130 in an area 140.

The invention claimed is:

1. A method using a 3D camera and radar for a vehicle for detecting an object in an area, the method comprising:
   collecting first measurement data related to the area by a sensor in the 3D camera, using a first sensor setting;
   receiving second measurement data related to the area from a radar; and
   adjusting the sensor setting of the 3D camera from the first sensor setting to an adjusted second sensor setting based on the second measurement data received from the radar to enable collection of third measurement data related to the area using the adjusted second sensor setting;
   collecting the third measurement data related to the area by the sensor in the 3D camera using the adjusted second sensor setting; and
   detecting the object based on interpreting of the third measurement data together with the second measurement data received from the radar.

2. The method according to claim 1, further comprising:
   classifying the detected object as a soft object or a hard object based on the third measurement data collected by the 3D camera and the second measurement data received from the radar.

3. The method according to claim 2, wherein the 3D camera and the radar are located at a vehicle, and the method further comprises:
   generating a command to carry out an accident-limiting measure for the vehicle based on the classification made of the detected object.

4. The method according to claim 1, further comprising: presenting the detected object.

5. The method according to claim 1, wherein the third measurement data contains measurement points detected in the area by the sensor of the 3D camera, and wherein the interpreting of the third measurement data together with the second measurement data received from the radar comprises a matching of the measurement points with the second measurement data received from the radar.

6. The method according to claim 1, wherein adjusting the sensor setting of the 3D camera comprises at least one adjustment selected from the following group: changing an exposure time of the 3D camera, modulating a frequency of a light wave emitted from the 3D camera, and phase-shifting the emitted light wave and/or the strength of the emitted light wave.

7. A computer program recorded on a non-transitory computer-readable medium and configured for detecting an object in an area by means of the method according to claim 1 when the computer program is executed in a processor circuit in the 3D camera.

8. A 3D camera for a vehicle, arranged for detecting an object in an area, comprising:
   a sensor arranged and configured to collect first measurement data related to the area using a first sensor setting and to collect second measurement data related to the area using an adjusted second sensor setting;
   a signal receiver arranged and configured to receive, from a radar, a signal containing third measurement data related to the area; and
   a processor circuit arranged and configured to detect an object, based on interpretation of the second measurement data together with the third measurement data received from the radar, and to adjust the sensor setting of the 3D camera from the first sensor setting to the adjusted second sensor setting, based on the third measurement data received from the radar, to enable collection of the second measurement data related to the area using the adjusted second sensor setting.

9. The 3D camera according to claim 8, wherein the processor circuit is further arranged and configured to classify the detected object as a soft object or a hard object based on the second measurement data, collected by the sensor, and the third measurement data received from the radar.

10. The 3D camera according to claim 9, wherein the 3D camera and the radar are contained in a vehicle, and wherein the processor circuit is further arranged and configured to generate a command to carry out an accident-limiting measure for the vehicle based on the classification made of the detected object.

11. The 3D camera according to claim 8, further comprising a display screen and wherein the processor circuit is further arranged and configured to send information to present the detected object on the display screen.

12. The 3D camera according to claim 8, wherein the second measurement data contains measurement points detected in the area by the sensor of the 3D camera; and
   the processor circuit is further arranged and configured to interpret the second measurement data together with the third measurement data received from the radar by matching the measurement points with the third measurement data received from the radar.

13. The 3D camera according to claim 8, wherein adjusting the sensor setting of the 3D camera comprises at least one adjustment selected from the following group: changing an exposure time of the 3D camera, modulating a frequency of a light wave emitted from the 3D camera, and phase-shifting the emitted light wave and/or the strength of the emitted light wave.

14. The 3D camera according to claim 8, wherein the 3D camera comprises: a time of flight camera, a stereo camera or a light-field camera.

15. A system for detecting an object in an area, wherein the system comprises:
   the 3D camera according to claim 8; and a radar arranged to emit a radio wave and receive a reflection of the radio wave from a measurement point.

16. A vehicle containing the system according to claim 15, configured to perform a method for detecting an object in an area.

* * * * *